United States Patent
Babej et al.

(10) Patent No.: US 7,677,074 B2
(45) Date of Patent: Mar. 16, 2010

(54) METHOD FOR THE PRODUCTION OF HOLLOW ELEMENTS, HOLLOW ELEMENT, ASSEMBLY PIECE, AND FOLLOW-ON COMPOSITE TOOL FOR CARRYING OUT SAID METHOD

(75) Inventors: Jiri Babej, Lich (DE); Michael Vieth, Bad Vilbel (DE); Richard Humpert, Rosbach (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 463 days.

(21) Appl. No.: 10/599,640

(22) PCT Filed: Apr. 13, 2005

(86) PCT No.: PCT/EP2005/003893
§ 371 (c)(1),
(2), (4) Date: Jan. 10, 2007

(87) PCT Pub. No.: WO2005/099930
PCT Pub. Date: Oct. 27, 2005

(65) Prior Publication Data
US 2007/0175262 A1 Aug. 2, 2007

(30) Foreign Application Priority Data
Apr. 13, 2004 (DE) .................. 10 2004 017 866

(51) Int. Cl.
*B21J 11/00* (2006.01)
(52) U.S. Cl. .................. 72/404; 470/21; 470/25; 470/89; 470/91
(58) Field of Classification Search .............. 470/18, 470/20–22, 25, 26, 89, 91, 93, 96.109, 197, 470/87; 72/404, 405.01
See application file for complete search history.

(56) References Cited

U.S. PATENT DOCUMENTS 2,096,623 A 10/1937 Almdale (Continued)

FOREIGN PATENT DOCUMENTS

DE 6 71 539 A1 2/1939

(Continued)

OTHER PUBLICATIONS

German Search Report for DE 10 2004 017 866.6 of Jan. 11, 2005 along with English language translation.

(Continued)

*Primary Examiner*—Dana Ross
*Assistant Examiner*—Stephanie Jennings
(74) *Attorney, Agent, or Firm*—Hershkovitz & Associates LLC; Abraham Herskovitz; Eugene C. Rzucidlo

(57) ABSTRACT

Disclosed is a method for producing hollow elements (200), such as nut elements, which are to be mounted on parts generally made of sheet metal, particularly for producing hollow elements having an at least substantially square or rectangular outer contour (202). According to said method, individual elements are cut to size from a profiled member that is provided in the form of a profiled bar or a reel after punching holes into said profiled member, optionally followed by embodying a threaded cylinder (206) using a follow-on composite tool (10) with several workstations (A, B, C, D). The inventive method is characterized in that a penetrating process, a punching process, and a flattening process are carried out in the workstations (A, B, C, D). Also disclosed are hollow elements (200), assembly pieces, and a follow-on composite tool (10).

23 Claims, 13 Drawing Sheets

U.S. PATENT DOCUMENTS

Figure 1:
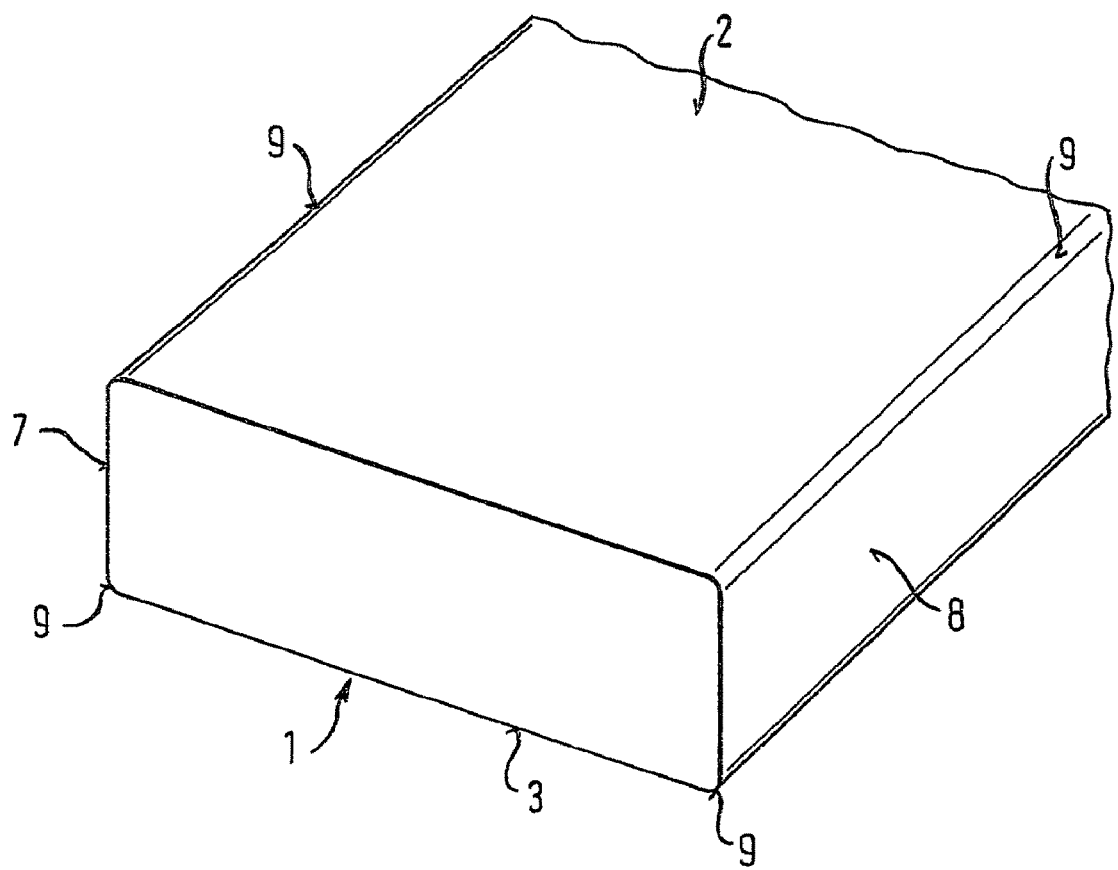

| | | |
|---|---|---|
| 2,206,740 A | 7/1940 | Burke |
| 3,775,791 A | 12/1973 | Grube |
| 3,999,659 A | 12/1976 | Grube |
| 4,971,499 A | 11/1990 | Ladouceur |
| 6,986,629 B2 | 1/2006 | Babej et al. |
| 7,090,451 B2 | 8/2006 | Babej et al. |
| 2003/0190214 A1 * | 10/2003 | Babej et al. ............ 411/180 |
| 2004/0042870 A1 | 3/2004 | Parker et al. |
| 2004/0042872 A1 | 3/2004 | Ward et al. |
| 2005/0166381 A1 | 8/2005 | Babej et al. |
| 2007/0175262 A1 | 8/2007 | Babej et al. |

FOREIGN PATENT DOCUMENTS

| | | |
|---|---|---|
| DE | 2 111 524 | 10/1971 |
| DE | 32 47 555 C2 | 8/1984 |
| DE | 695 07 348 T2 | 6/1999 |
| DE | 101 15 420 | 10/2001 |
| DE | 202 05 192 U1 | 12/2002 |
| DE | 10 2004 045 159 A1 | 9/2005 |
| EP | 0 663 247 A1 | 7/1995 |
| EP | 1 559 488 | 8/2005 |
| GB | 551845 | 5/1942 |
| GB | 1 306 882 | 2/1973 |
| GB | 1 373 633 | 11/1974 |
| GB | 1 472 751 | 5/1977 |
| GB | 2 008 449 | 11/1978 |
| WO | WO 01/28723 A1 | 4/2001 |
| WO | WO 01/72449 A2 | 10/2001 |
| WO | WO 04/050269 A2 | 11/2003 |
| WO | WO 2005/099930 | 10/2005 |

OTHER PUBLICATIONS

International Search Report for PCT/EP2005/003893 of Jun. 17, 2005.

* cited by examiner

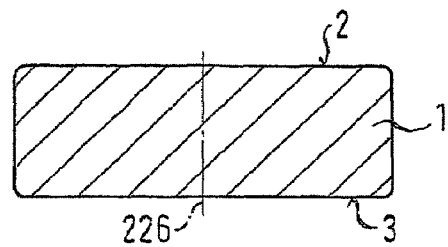
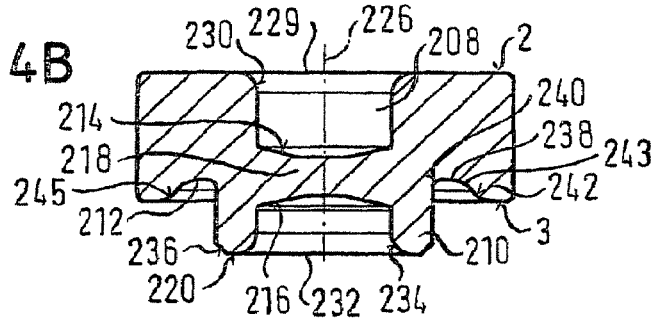
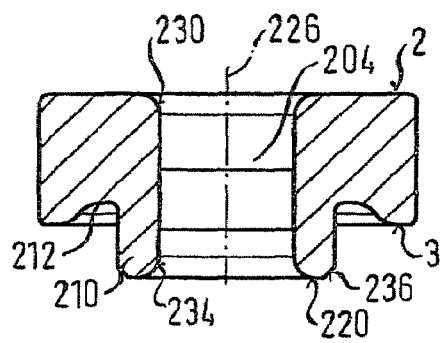
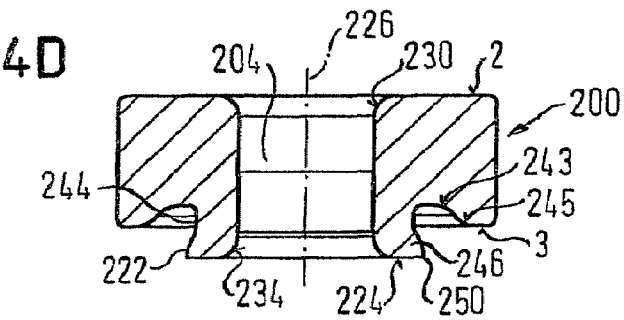
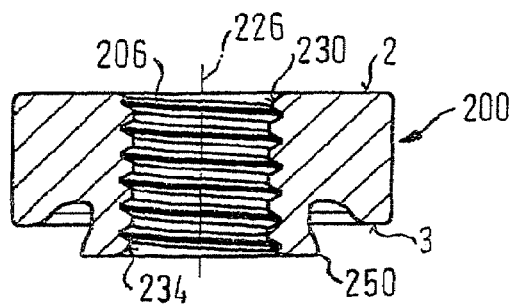

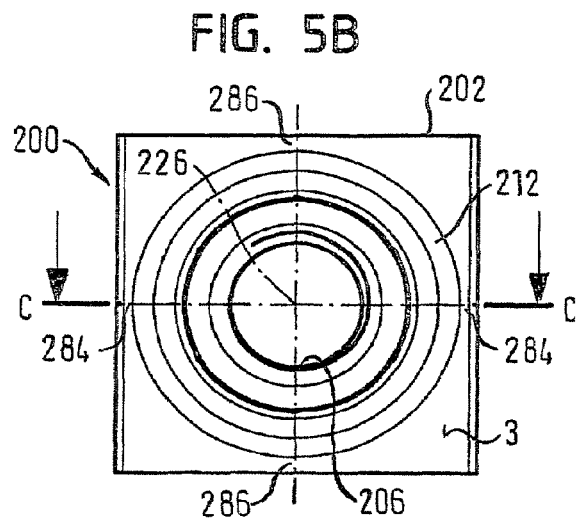
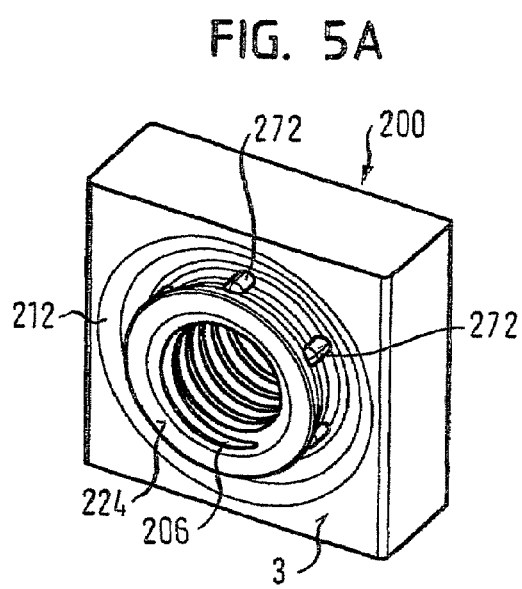
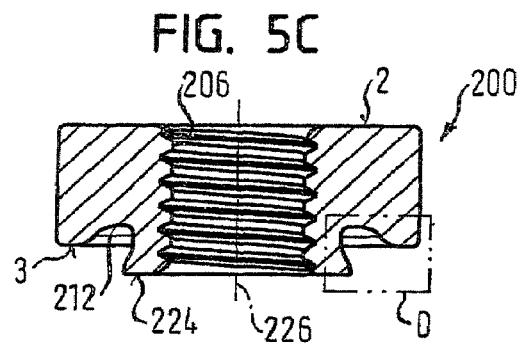
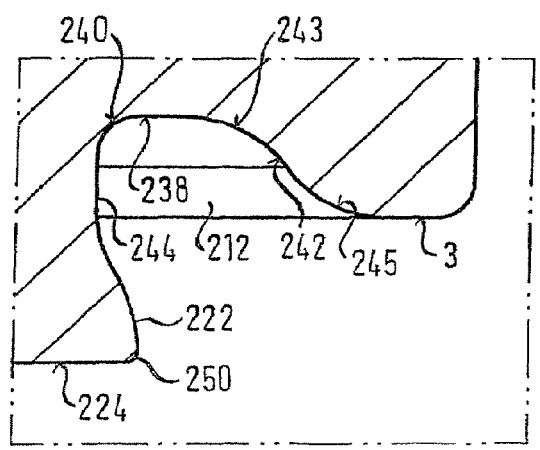

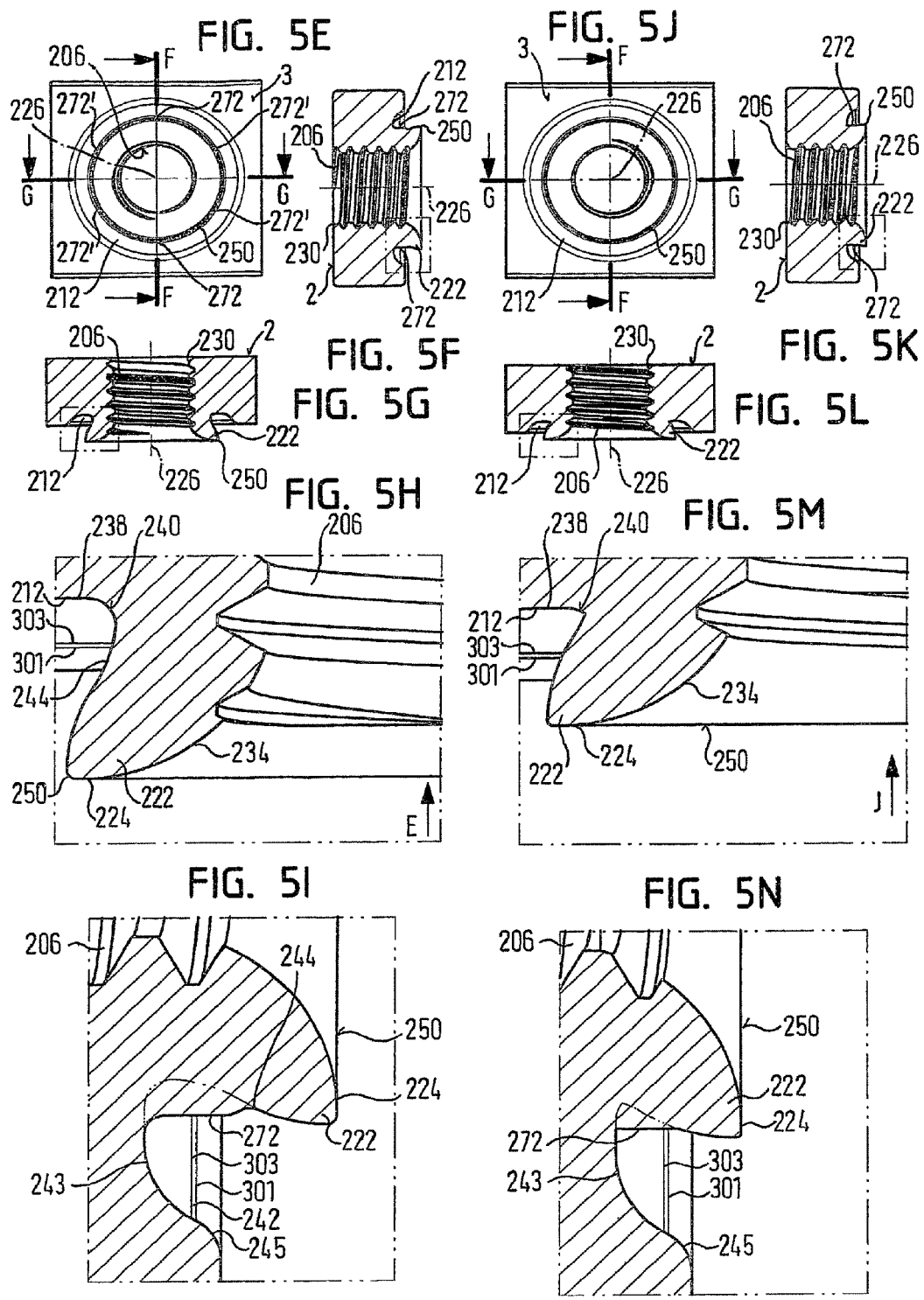

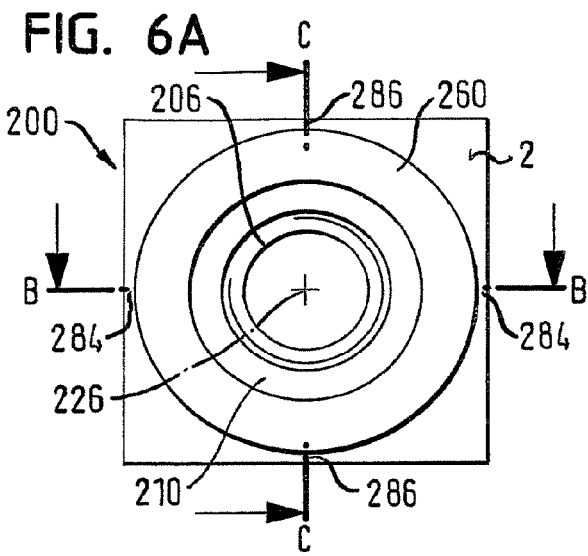
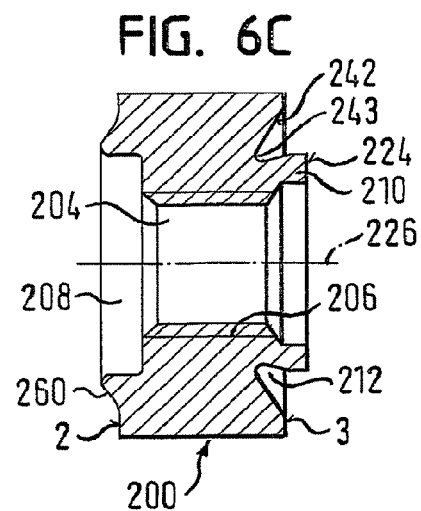
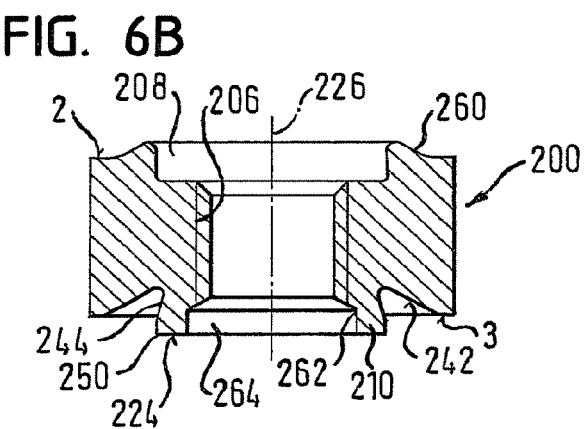
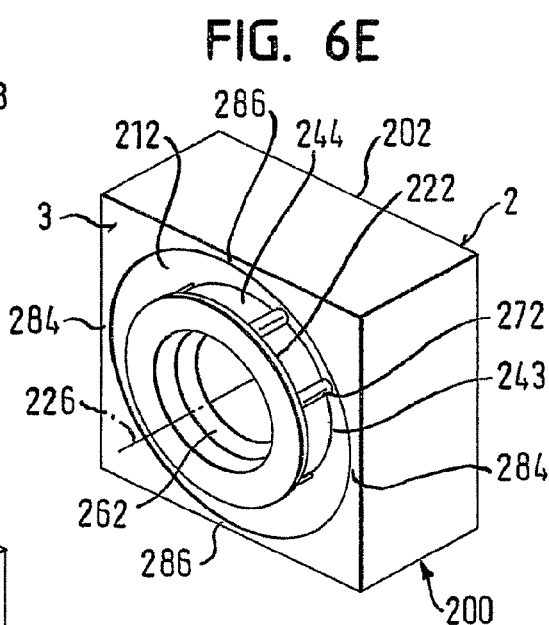
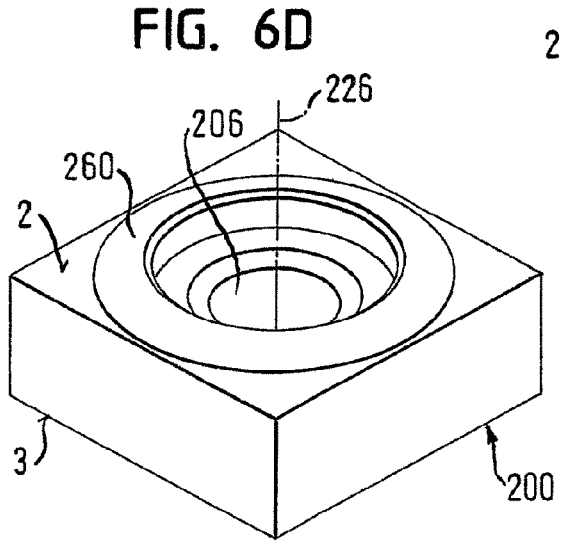

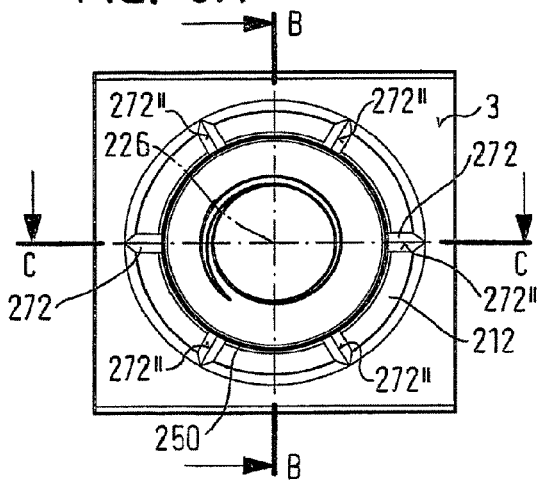
FIG. 8A
FIG. 8B
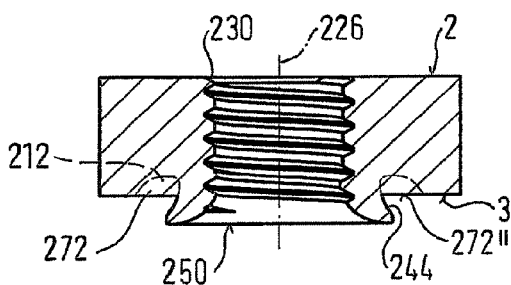
FIG. 8C
FIG. 8D
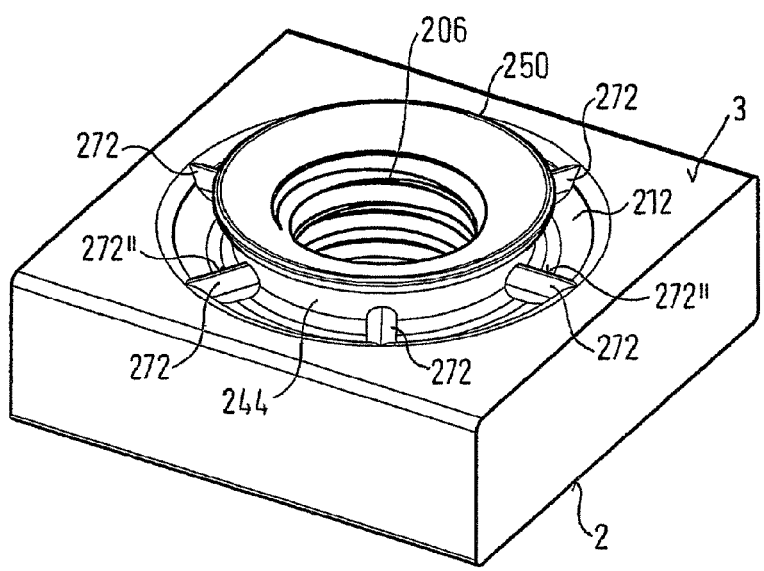

METHOD FOR THE PRODUCTION OF HOLLOW ELEMENTS, HOLLOW ELEMENT, ASSEMBLY PIECE, AND FOLLOW-ON COMPOSITE TOOL FOR CARRYING OUT SAID METHOD

The present invention relates to a method for manufacturing hollow body elements such as nut elements for attachment to components normally consisting of sheet metal, in particular for the manufacture of hollow body elements, having an at least substantially square or rectangular outline by cutting individual elements to length from a section present in the form of a profile bar or of a coil after prior piercing of holes into the section, optionally with subsequent formation of a thread cylinder using a progressive tool having a plurality of working stations in each of which respective operations are carried out. Furthermore the present invention relates to hollow body elements which are manufactured in accordance with the method, component assemblies which consist of a hollow body element and a sheet metal part and also a progressive tool for carrying out the method.

A method of the initially named kind and also corresponding hollow body elements and component assemblies are, for example, known from WO 01/072449 A2. A method of this kind is also known from U.S. Pat. No. 4,971,499. Rectangular hollow body elements are also sold by the company Profil Verbindungstechnik GmbH & Co. KG in Germany under the designation HI rectangular nut.

The object of the invention is to further develop the method of the initially named kind such that hollow body elements, in particular rectangular nut elements can be manufactured at a favorable prize without loading the tools that are used such that they prematurely fail. Furthermore, the hollow body elements should have mechanical characteristics which are at least as good as those of the hollow body elements which are manufactured in accordance with WO 01/72449 A2 or in accordance with the German Utility Model 202 05 192.7, for example have a high pullout force, an excellent security against rotation and which in addition show a reduced notch effect so that the fatigue characteristics of component assemblies consisting of a component from sheet metal and hollow body elements attached to it are also improved under dynamic loads.

The object underlying the invention is satisfied by a method of the initially named kind, which is characterized by the following steps:
 a) in a first step, starting from a section rectangular in cross-section, an upsetting process is carried out which leads to a cylindrical recess at a first broad side of the section and to a hollow cylindrical projection at a second broad side of the section opposite to the first broad side, the projection being surrounded by a ring-shape recess,
 b) in a second step, a web remaining between the base of the cylindrical recess and the base of the hollow cylindrical projection is pierced or punched out to form a through-going aperture,
 c) in a third step, which can optionally be combined with the step b), the hollow cylindrical projection is flattened or crushed at its free end for the formation of a piercing section undercut at the outer side, whereafter the hollow body element (200) is separated from the section and optionally provided with thread.

Furthermore, the present invention provides a hollow body element for attachment to a component normally consisting of sheet metal having an in particular at least substantially square or rectangular outline, with a first broad side and a second broad side, with a piercing section which projects beyond the second broad side and has an undercut and is surrounded by a ring recess in the second broad side and also with an aperture which extends from the first broad side through the piercing section, with the aperture optionally having a thread cylinder, characterized in that features providing security against rotation are formed outwardly at the hollow cylindrical projection and/or inwardly in the region of the ring recess around the hollow cylindrical projection.

In the method of the invention, the section that is thus used as a rectangular cross-section and can accordingly be manufactured at favorable price. Through the steps a), b) and c), one succeeds in manufacturing hollow body elements without the tools that are used being subjected to a high level of wear and without the punches that are used failing prematurely. The method claimed in the German patent application 10204589.5 and also the corresponding progressive tools described there are also straightforwardly suited, with an appropriate design of the punches and dies used for the steps a), b) and c) for carrying out the present method and for manufacturing the corresponding hollow body elements.

The manufacture in working steps in which two operations are always carried out for one section in one station leads to the productivity of the manufacturing plant being doubled without the cost and complication for the manufacture of the progressive tool arising to a degree which would no longer be worthwhile. The doubling up of working elements admittedly requires a certain additional cost and complexity, this can, however, be straightforwardly amortized relatively early by corresponding production quantities.

It is indeed possible to process a plurality of sections in one progressive tool, this is, however, not necessarily to be preferred because, if problems arise with one section or with the processing of one section, the entire progressive tool must be stopped until the fault has been remedied, whereby considerable production losses could arise. Nevertheless, the present invention could be realized using a progressive tool which simultaneously processes a plurality of sections.

Particularly preferred embodiments of the method of the invention, of the hollow body elements of the invention, of the component assemblies of the invention and also of the progressive tool of the invention can be found in the further patent claims.

Further advantages of the method of the invention, of the hollow body elements of the invention and also of a progressive tool used in accordance with the invention can be found in the drawings and in the subsequent description of the drawings.

Figure 2:
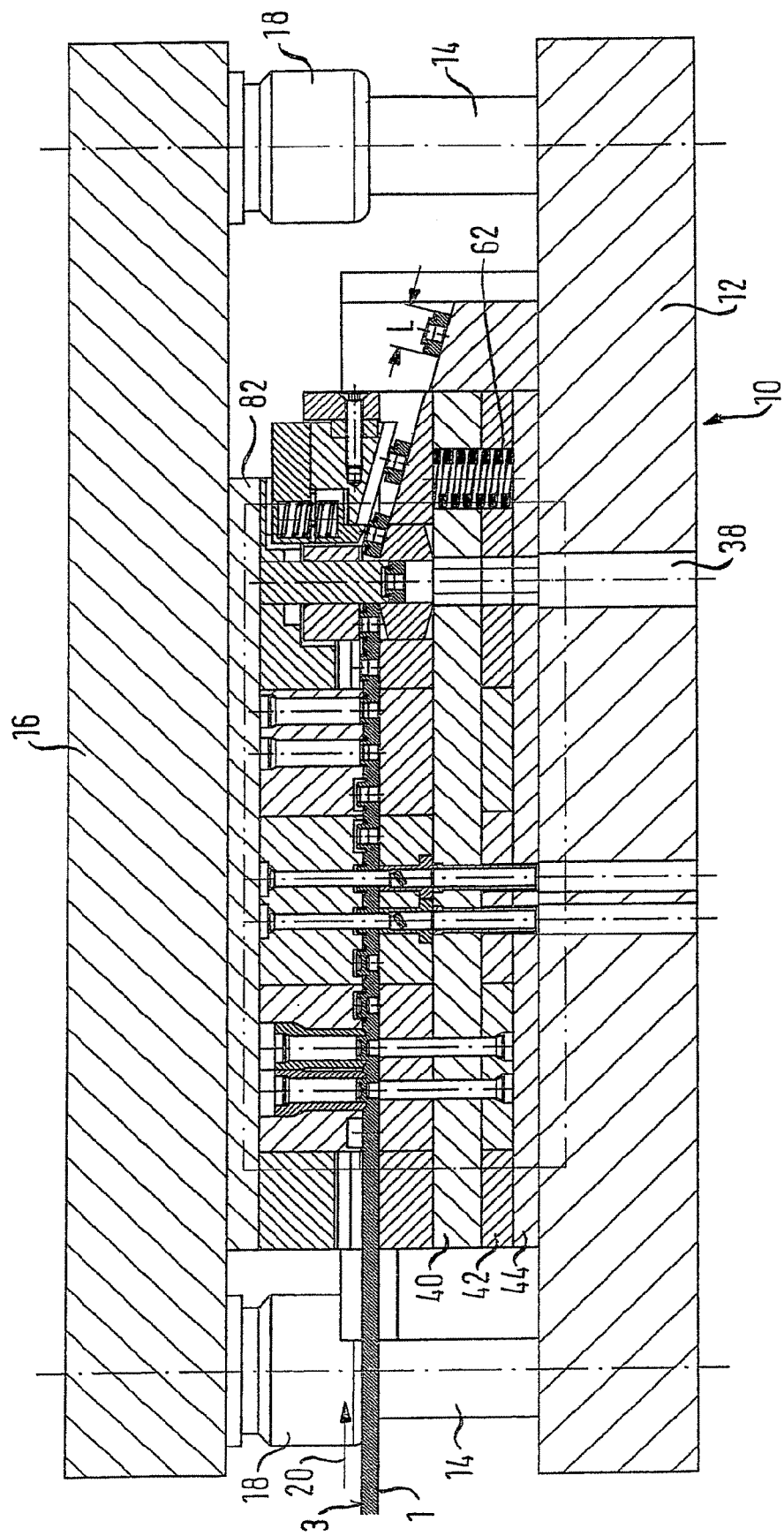
Figure 3:
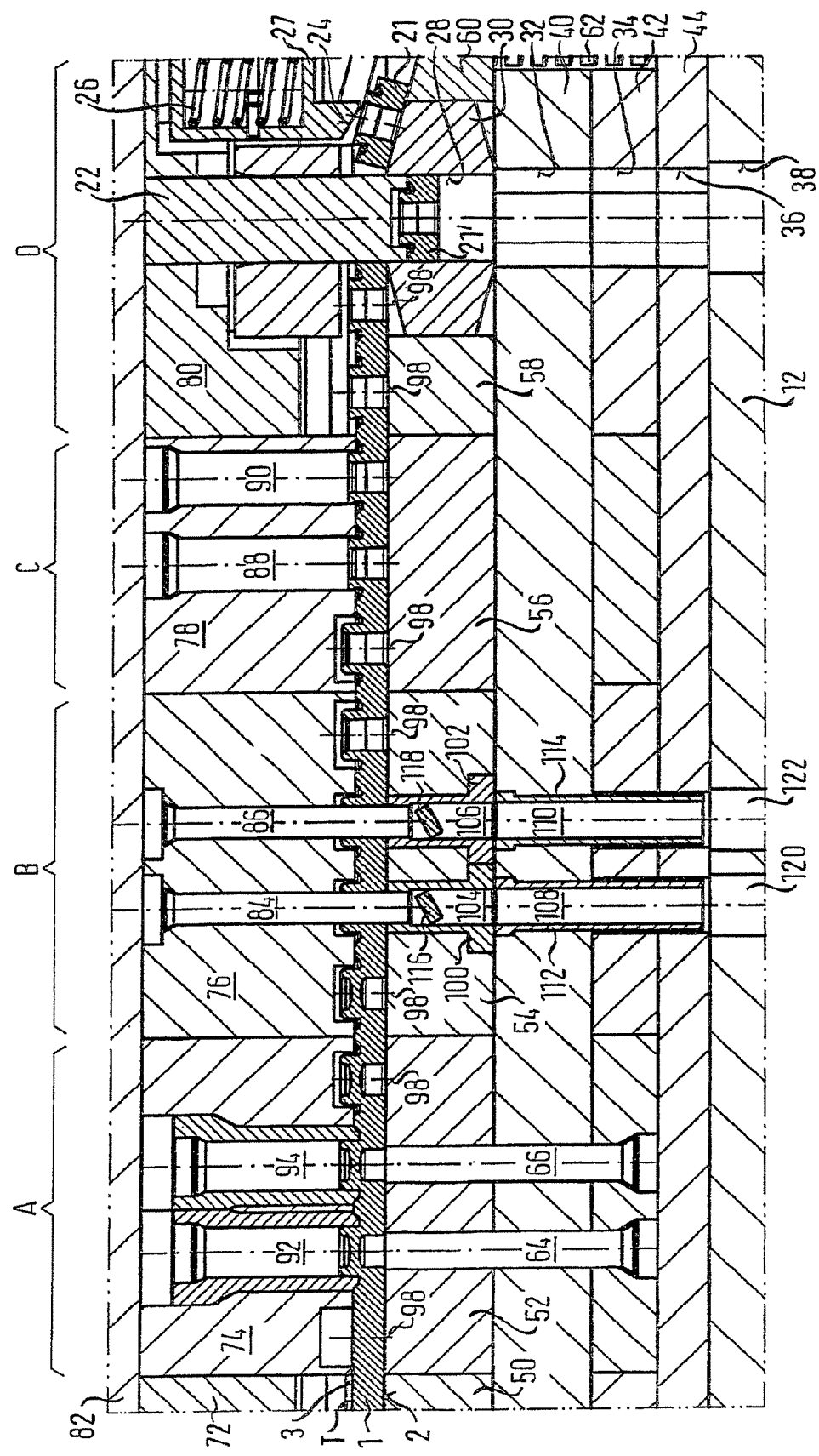

The Figures show:

FIG. 1 an embodiment of a section which is processed for the purpose of the present invention in a progressive tool in accordance with FIG. 2, with FIG. 2 showing a progressive tool section in the direction of movement of the section, FIG. 3 an enlarged representation of a progressive tool of FIG. 2 in the region of the working stations, FIGS. 4A-4E a representation of the individual steps for the manufacture of a hollow body element in accordance with the invention using the method of the invention and the progressive tool of FIGS. 2 and 3, FIGS. 5A-5N various representations of the finished hollow body element of FIGS. 4A-4E in accordance with the invention, with FIG. 5A showing a perspective representation of the hollow body element of the invention from below, FIG. 5B a plan view of the hollow body element of the invention from above, FIG. 5C a sectional drawing corresponding to the section plane C-C or C'-C' of FIGS. 5B, and 5D an enlarged representation of the region D of FIG. 5C; the further FIGS.

Figure 7A:
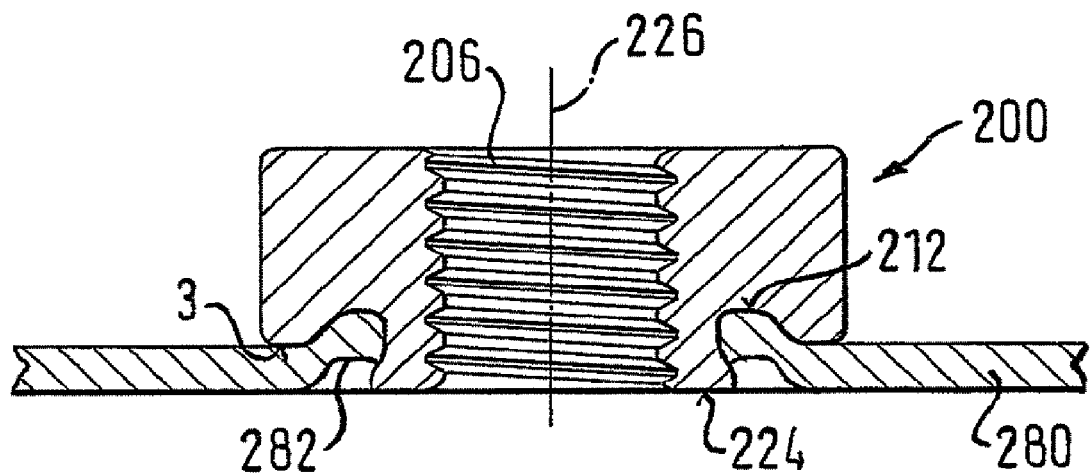
Figure 7B:
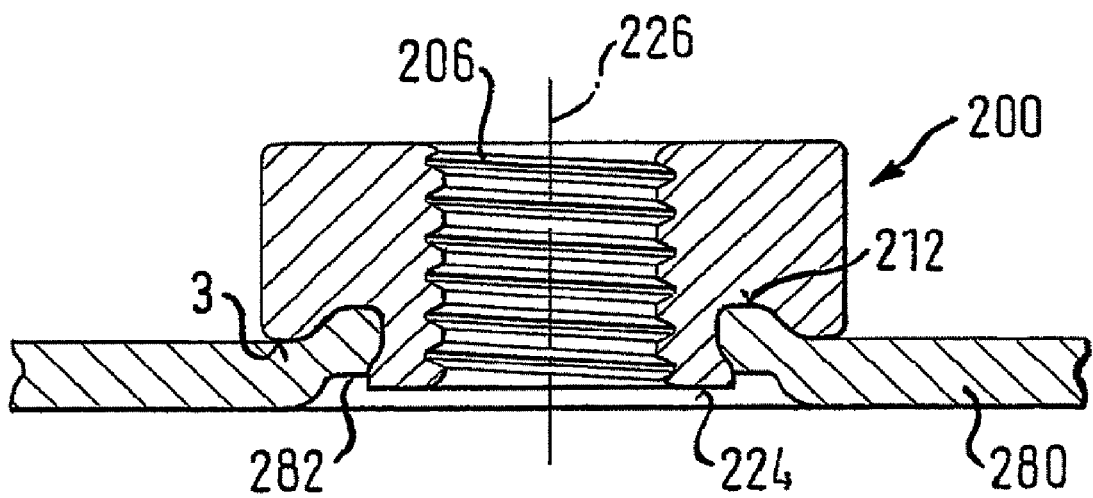

5E-5I show an ideal variant of the hollow body element of FIGS. 5A-5D and indeed designed for thicker sheet metal parts, whereas the FIGS. 5J-5N show a further ideal variant which is designed for use with thinner sheet metal parts, FIGS. 6A-6E representations of a further hollow body element in accordance with the invention which represents a slight modification of the hollow body element in accordance with FIGS. 5A-5D, with FIG. 6A showing a plan view of the hollow body element from above, FIG. 6B a section drawing along the section plane B-B of FIG. 6A, FIG. 6C a section drawing in accordance with a section plane C-C of FIG. 6A, and FIGS. 6D and 6E perspective representations of the functional element from above and below, FIGS. 7A-7B the attachment of the hollow body element of the invention to a thin sheet metal part and to a thicker sheet metal part respectively, FIGS. 8A-8D representations of a further variant of a hollow body element with features providing security against rotation in the form of radially extending ribs which bridge the ring recess, with FIG. 8A being a view of the hollow body element from below, the FIGS. 8B and 8C being section drawings corresponding to the horizontal section plan B-B and to the vertical section plane C-C of FIG. 8A, and the FIG. 8D being a perspective drawing, FIGS. 9A-9D representations corresponding to FIGS. 8A-8D, but of an embodiment with obliquely set ribs providing security against rotation which extend in the radial direction across the ring recess and in the axial direction along the undercut of the piercing section, FIGS. 10A-10D representations corresponding to FIGS. 8A-8D, but of an embodiment with angled ribs providing security against rotation which extend in a radial direction across the ring recess and in the axial direction along the undercut of the piercing section, FIGS. 11A-11D representations in accordance with FIGS. 8A-8D, but of an embodiment with features providing security against rotation which are formed by grooves or recesses, and FIGS. 12A-12D representations corresponding to FIGS. 8A-8D but of an embodiment with a polygonal ring shape in plan view, of square shape in the specific case.

FIG. 1 shows a portion of an elongate section 1 with a rectangular cross-section, a first broad side 2, a second broad side 3 and two narrow sides 7, 8. The longitudinal edges 9 of the section can be rounded as shown. It can, however, also have another shape, for example a chamfer or a rectangular shape. The section is processed in a progressive tool in order to manufacture hollow elements, for example nut elements with an essentially rectangular or square shape. When the hollow elements are to be realized as nut elements a thread must be cut or produced in the aperture of the hollow body element. This normally takes place outside of the progressive tool in a separate machine. Furthermore, the possibility exists of only manufacturing the thread after the attachment of the hollow body element to a sheet metal part, for example by means of a thread forming or thread cutting screw. Furthermore, it is not necessary to provide a thread in the hollow body element, but rather the aperture of the hollow body element could serve as a smooth bore for the rotational journaling of a shaft or as a plug amount to receive a plug-in pin.

A first progressive tool 10 which serves for the manufacture of the hollow body elements from the section 21 of FIG. 1 or from a similar section and which is claimed per se in the German patent application 102004004589.5 is shown in FIG. 2 in longitudinal section, with the longitudinal section being taken through the centre of the section.

One can see from FIG. 2 a lower plate 12 which is normally secured to a press table either directly or indirectly via an intermediate plate, not shown. The lower plate 12 carries a plurality of columns 14, four in this example, of which two can be seen, namely the two columns which lie behind the section plane. A further plate 16 is present above the columns and is normally secured to the upper tool plate of the press or to an intermediate plate of the press. Guides 18 are screwed to the plate 16 (for example by means of screws which are not shown here) with the guides 18 being designed in order to slide up and down on the columns 14 in accordance with the stroke movement of the press. The section 1 is advanced in the arrow direction 20 for each stroke of the press and indeed by an amount which corresponds to twice the longitudinal dimension L of the individual hollow body elements manufactured from the section. One notes that in the representation in accordance with FIGS. 2 and 3 the section 1 is guided with a second broad side 3 directed upwardly through the progressive tool. As can be seen from the enlarged representation of the central region of the progressive tool of FIG. 3, the progressive tool includes in this example four working stations A, B, C, D in each of which two respective operations are simultaneously effected for each stroke of the press.

In the first station A a so-called upsetting process takes place as a first step a).

In the second working station B, a piercing process is carried out in a second step b) and a crushing or flattening process is carried out in the third working station C in a third step c). Finally, a cut-off punch 22 is used in the fourth working station D in order to separate two hollow body elements from the section 1 for each stroke of the press. In doing this, the right hand side of the punch cuts through the section at a partitioning point which is located behind the first hollow body element, i.e. the hollow body element 21 in FIG. 3 and also at a cutting point behind the second hollow body element 21'. The progressive tool is shown in FIGS. 2 and 3 in the closed position in which the two hollow body elements 21 and 21' have just been cut from the section 1. Shortly before the cut-off process, the front side of the nut element 21 contacts the inclined surface 24 of the right angled cam 27 which is pressed downwardly by a compression coil spring 26. The advance of the strip of the section thus presses the cam 24 upwardly via its inclined surface, whereby the spring 26 is compressed. After the first hollow body element 21 has been cut off, the cam 24 presses on the right hand side of the nut element 21 and tips it into the inclined position which is evident at the right hand side of FIG. 3. The nut element 21 then falls on a slide out of the working range of the progressive tool and can, for example, then be led sidewise out of the progressive tool in accordance with FIG. 2, for example via a lateral slide under the effect of gravity or with a burst of compressed air, etc.

The second hollow body element 21' falls through a hole 28 in the cut-off die 30 and subsequently through corresponding bores 32, 34, 36 and 38 which are formed in the plates 40, 42, 44 and 12.

The bores or the hole 38 in the plate 12 can lead with a further bore (not shown) in the press table or in any intermediate plate that is provided between the plate 12 and the press table which enables the nut elements such as 21' to be led out, for example under the action of gravity or also via a lateral slide or using a burst of compressed air.

In the specific construction shown in FIG. 3 ,the plate 44 is screwed via nonillustrated screws to the plate 12. The plate 42 consists of a plurality of plate sections which are associated with the respective working stations and which are screwed via further non-illustrated screws (because they are arranged outside of the plane of the sectional representation) to the through-going plate 44. The through-going plate 40 is likewise screwed to the sections of the plate 42, and indeed also here by means of non-illustrated screws. Above the through-going plate 40, there are in turn plate sections 50, 52, 54, 56, 58 and 60 which are in turn screwed to the plate 40. The plate 50 is a support plate which forms a lower guide for the section 1, stated more precisely for the first broad side 2 of the section 1 which, in this representation, forms the lower side. The plate sections 52, 54 and 56 are associated with the working stations A, B and C, whereas the plate sections 58 and 60, which form a receiver for the cut-off die 30, are associated with the working station D.

Powerful compression coil springs 62 of which only the one spring can be seen in FIGS. 2 and 3, because the others are located outside of the section plane, are located at a plurality of positions between the through-going plate 44 and the plate sections 50, 52, 54, 56, 58 and 60. These springs such as 62 have the function of lifting the plate sections 50 to 60 on the opening of the press, whereby the strip of section 1 is also lifted and hereby moves out of the working range of the upsetting punches 64, 66, whereby the section can be further advanced by twice the amount of the length L of the hollow body elements 21.

The partition plane of the progressive tool is located above the section 1 and is designated with T in FIG. 3.

Above the strip of the section, there are in turn located plate sections 72, 74, 76, 78 and 80 which are screwed to a through-going plate 82-also here via non-illustrated screws. Furthermore, the plate 82 is screwed to the upper plate 16.

On the opening of the press, the plates 72, 74, 76, 78 and 80 are thus lifted with the plate 22 and the upper plate 16, and indeed so far that the two hole punches 84, 86 and the two upper flattening punches 88 and 90 as well as the dies 92 and 94, which cooperate with the upsetting punches 64, 66, and also the cut-off punch 22 move out of engagement with the strip of the section 1. Through this movement, coupled with the lifting of the strip of the section by the spring 62, it is made possible for the strip of the section 1 to be able to be further advanced by twice the length dimension of the hollow body elements 21 in preparation for the next stroke of the press.

One sees that the working stations A and B have a longitudinal dimension, i.e. in the direction 20 of the strip of the section 1 which corresponds to four times the length dimension of the hollow body element 21. The working station C has a length dimension which corresponds to three times the length dimension of the hollow body element 21 whereas the working station D has a length dimension which corresponds to a multiple of the length dimension of the hollow body element 21, in this example six times as much.

This signifies that so-called empty positions such as 98 are present at which no processing of the strip of the section 1 takes place. These empty positions, however, provide space which is necessary in order to be able to make the individual components of the tools that are used sufficiently stable and to support them.

Furthermore, one can see from FIG. 3 that the piercing dies 100, 102, which cooperate with the piercing punches 84, 86 have a central bore 104 and 106 respectively, which are aligned with further bores 108, 110 in insert sleeves 112, 114 which enable the punched out slugs 116, 118 to be removed. These namely fall downwardly through the bores 108, 114 which are larger in diameter than the bores 104, 106 and through the further bores 120, 122 in the plate 12 and can be disposed off or led away via corresponding passages in the press table or in an intermediate plate which may be provided in the same way of means as the nut elements 21.

Although not shown here, guide elements are located to the left and right of the strip of the section 1, i.e. behind the plane of the drawing and in front of the plane of the drawing of FIG. 3 and can for example be formed by cheeks of the plates 50, 52, 54, 56 and 58, which ensure that the strip of the section follows the desired path of movement through the progressive tool. A small lateral free space can be provided which permits any expansion of the strip of the section which may occur in the transverse direction.

The design details of the upsetting punches 64, 66 of the die buttons 92, 94 which cooperate with them, of the hole punches 84, 86, of the die buttons 100, 102 which cooperate with them and of the flattening punch 88, 90 can be seen from the drawings of FIGS. 2 and 3 and will in other respects be explained more precisely in the following drawings.

By means of the progressive tools of FIGS. 2 and 3 a method is realized for the manufacture of hollow body elements such as nut elements for attachment to components which usually consist of sheet metal. The method serves for the manufacture of hollow body elements 21, 21', for example with an at least substantially square or rectangular outline by cutting individual elements to length from a section 1 present in the form of a sectional bar or of a coil after the prior punching of holes 23 into the section 1, optionally with subsequent formation of a thread cylinder using a progressive tool with a plurality of working stations A, B, C, D in which respective operations are carried out. The method is characterized in that in each case two operations are simultaneously carried out for each stroke of the progressive tool in each working station A, B, C, D for the section 1 or for a plurality of sections arranged alongside one another. I.e. it is basically possible to process a plurality of sections 1 alongside one another and at the same time in the same progressive tool, assuming that the corresponding number of individual tools such as upsetting punches, hole punches and associated die buttons is present.

In the last working station, two hollow body elements 21, 21' are in each case cut from the section or from each section 1 by means of a cut-off punch 22.

The cut-off punch 22 cuts through the section at a first point behind a first hollow body element 21 and at a second point behind a second hollow body element 21', with the second hollow body element 21' being guided out of the path of movement of the section in the direction of movement of the cut-off punch transversely to the longitudinal direction of the section 1. The first hollow body element 21 is led out at least initially in general in the direction of the path of movement of the section in the cut-off station of the progressive tool.

Each working station of the progressive tool has a length in the longitudinal direction of the section which corresponds to three times or four times or the multiple of the longitudinal dimension of a finished hollow body element 21, 21'.

In the embodiment of the progressive tool shown, a spring loaded cam 27 having a cam surface 24 set obliquely to the path of movement of the section is biased by the front edge of the front end of the section at the outlet end of the last working station against the force of the spring device 26. After cutting off the hollow body element 21 formed at the front end of the section it is tilted downwardly by the spring-loaded cam in order to facilitate the removal from the progressive tool.

In the embodiment of FIGS. 2 and 3, the lower stamps 64, 66 operate to carry out the upsetting process and the hole punches 84, 86 to carry out the piercing process from opposite sides of the section 1 on the latter. When carrying out the flattening process, the respective flattening stamps 88, 90 act from above on the strip of the section 1 while the strip is supported in the region of a piercing by a plate section 56.

Instead of this, it would also be possible to arrange support pins at the plate section 56 at the points of the holes in the strip of the section if it appears necessary to support the section material in this region during the flattening process, for example in order to achieve a more sharp edged design of the end face of the hollow piercing section.

Some examples will now be given which describe the manufacture of the specific hollow body elements.

Referring to FIGS. 4A-4E and FIGS. 5A-5D, the method of the invention for the manufacture of hollow body elements such as nut elements will now be described which are designed for application to components which normally consist of sheet metal. One is concerned here in particular with a method for the manufacture of hollow body elements 200 having an at least substantially square or rectangular outline 202 by cutting individual elements to length from a section present in the form of a sectional bar (1, FIG. 1) or a coil after the prior stamping of apertures 204 in the section, optionally with subsequent formation of a thread cylinder 206 using a progressive tool (FIG. 2, FIG. 3) having a plurality of working stations A, B, C and D, in which respective operations are carried out. The method is characterized by the following steps:

a) In a first step, starting from section 1, FIG. 4A which is rectangular in cross-section, an upsetting process is carried out using upsetting die buttons 92, 94 which come from the top and the setting punches 64, 66. The upsetting process leads to a cylindrical recess 208 at a first broad side 2 of the section 1 and to a hollow cylindrical projection 210 at a second broad side 3 of the section lying opposite to the first broad side 2, with the projection being surrounded by a ring-like recess 212 which is shown in FIG. 4B. The strip of the profile 1 is pressed during closing of the press or of the progressive tool onto the ends of the upsetting punches 64 and 66 projecting above the plate section 52. The projecting ends of the upsetting punches have a shape complementary to the shape of the cylindrical recess 208 which is shown in FIG. 4B. In similar manner, the end faces of the die buttons 92, 94 cooperating with the upsetting punches have a shape complementary to that of the hollow cylindrical projection 210 and to the ring recess 212 surrounding it in accordance with FIG. 4B.

b) In a second step, a web 218 which remains between the base 214 of the cylindrical recess 208 and the base 216 of the hollow cylindrical projection 210 is pierced on the closing of the press or of the progressive tool 10 by means of the hole punch 88, 90 to form the throughgoing aperture 204 (FIG. 4C). The punched-out slugs are disposed of as mentioned via the bores 104, 106 and 108, 110 respectively.

c) In a third step, the hollow cylindrical projection 210 is flattened at its free end face 220 to form a piercing section 222 undercut on the outer side, whereby the end face 224 in FIG. 4D is formed which stands in a plane parallel to the broad sides 2 and 3 and perpendicular to the central longitudinal axis 226 of the aperture 204. Thereafter, the hollow body elements can be separated from the section in the working station D and subsequently be provided with a thread 206 if required, as shown in FIG. 4E or in the identical FIG. 5C.

The third step could, if required, be combined with the step b).

During the upsetting process of the step a), the diameter of the cylindrical recess and the inner diameter of the hollow cylindrical projection are made at least substantially the same.

Furthermore, the opening 229 of the cylindrical recess 208 at the first broad side 2 of the section is provided with a rounded or chamfered run-in edge 230 which forms the thread run-out when using the element, preferably during the upsetting process of step a) or during the piercing process of step b) or during the flattening process of step c).

During the upsetting process of step a) or during the piercing process of step b) or during the flattening process of step c), the mouth 232 of the hollow cylindrical projection 210 is preferably also provided with a rounded or chamfered run-out edge 234 which forms the thread run-in in the finished element.

During the piercing of the web in accordance with step b,) the aperture 204 is produced with a diameter which at least substantially corresponds to the diameter of the cylindrical recess 208 and to the inner diameter of the hollow cylindrical projection 210. Furthermore, during the upsetting process of the first step a), the free end of the hollow cylindrical projection 210 is provided at the outside with a chamfer 236. Moreover, during this upsetting process, the ring recess 212 is provided with a ring-like base region 238 which stands at least approximately in a plane parallel to the first and second broad sides 2, 3 of the strip of the section and merges at the radially inner side with an at least substantially rounded transition 240 into the outer side of the hollow cylindrical projection 210 and merges at the radially outer side into a conical surface 242 which forms an included cone angle in the range between 60 to 120°, preferably of about 90°.

The transition 243 from the ring-like region 238 of the ring recess 212 into the conical surface 242 is rounded as is also the run-out 245 of the conical surface of the ring recess 212 into the second broad side 3 of the section. The conical surface 242 can present itself in practice such that the rounded transition 243 merges tangentially into the rounded run-out 245.

During the manufacture of the undercut 244, the latter is formed by a cylindrical part of the hollow cylindrical projection 210 which merges approximately at the level of the second broad side 3 of the section 1 into a region 246 of the hollow cylindrical projection 210 which is thickened during the carying out of the step c) and which at least substantially projects beyond the second broad side 3 of the section.

The thickened region 246 of the hollow cylindrical projection 210 is made at least substantially conical and diverges away from the first and second broad sides, with the cone angle of the thickened region of the hollow cylindrical projection adjacent to the end face 224 lying in the range between 30° and 70°, preferably at about 50°. After the flattening process, the hollow cylindrical projection 219 terminates at its free end at the outside in a piercing edge 250 which is made as sharp edged as possible.

As can be seen from FIGS. 5A and 5B in particular, the ring recess is executed with an outer diameter which is only somewhat smaller than the smallest transverse dimension of the hollow body element which is rectangular in plan view, whereby the ring recess 212 forms with the second broad side 3 at the section 1 webs 284, 286 in the range from 0.25 to 1 mm, preferably of about 0.5 mm which remain at the narrowest points in the plane of the second broad side 3.

The FIGS. 5E-5I and 5J-5N show essentially the same elements as in the FIGS. 5A-5D but with small differences with respect to the design of the piercing section 222 which has an ideal shape in the two versions according to FIGS. 5E-5I and 5J-5N.

In the FIGS. 5E-5I and 5J-5N the same reference numerals have been used which were also used in conjunction with the previous embodiments. It will be understood that the previous description also applies to the FIGS. 5E-5I and 5J-5N, i.e. that the previous description of features with the same reference numerals also applies to the description of the FIGS. 5E-5I and 5J-5N. This convention is also retained in the further Figures so that only important differences or significant features will be especially described here.

The main difference between the embodiments of FIGS. 5E-5I and the embodiment of FIGS. 5J-5N lies in the fact that the embodiment of FIGS. 5E-5I is used for thicker sheet metal in the range of, for example, 1.2 to 2.0 mm sheet metal thickness whereas the embodiment of FIGS. 5J-5N is used for somewhat thinner sheet metal, for example in the range of 0.4 to 1.2 mm sheet metal thickness.

Specifically, FIG. 5E shows a view from below onto the lower end face of the piercing section 222, i.e. in the arrow direction E of FIG. 5H. The FIG. 5F is a sectional drawing corresponding to the vertical section plane F-F in FIG. 5E, so that in FIG. 5F the two ribs 272 providing security against rotation which extend in the axial direction and which are located at the 12 o'clock and the 6 o'clock positions in FIG. 5E can each be seen in section. In contrast four further ribs 272' providing security against rotation which are entered into FIG. 5E can be seen neither in FIG. 5F nor in FIG. 5G which shows a section drawing in accordance with the section plane G-G. They can also only be recognized by way of indication in FIG. 5E because they are in principle largely hidden behind the piercing section 222. They are not evident in the sectional drawing of FIG. 5 because the section plane is selected such that the ribs 272 or 272' providing security against rotation do not lie in the plan of the section or adjacent the plane of the section and are also not sufficiently large that they could be recognized in side view on the section plane.

The FIGS. 5H and 5I each show an enlarged representation of the regions shown in a chain-dotted rectangle in FIGS. 5G or 5F respectively. It can be seen from FIG. 5H to 5I that the lower end face 224 of the piercing section 222 is formed by a radius in the section plane which runs out tangentially at the cutting edge 250.

This represents a distinction to the end face 224 of the embodiment of FIGS. 5A-5D which has a significant ring surface component in a plan perpendicular to the central longitudinal axis 226 of the hollow body element.

Furthermore it can in particular be recognized from the drawings of FIGS. 5H and 5I that the region of the ring recess 212 designated as a conical inclined surface 242 in FIG. 5D is actually formed by two radii which merge into one another at a turning point. In this example, with only a very short straight portion which is indicated by the two lines 301 and 303 and which in practice also does not have to be present, i.e. the two radii which form the obliquely set wall of the recess (curved regions 243 and 245) can merge directly into one another tangentially. Nevertheless, in the region of the turning point a surface region is present which can be termed approximately flat so that the designation "at least substantially conical" is justified. Naturally, a clearer strictly conical region could also be provided.

Through the use of the same reference numerals it can be seen that the FIGS. 5J-5N are to be understood in precisely the same way as the FIGS. 5E-5I. The only difference here is that the noses 272' providing security against rotation in FIG. 5E cannot be seen in FIG. 5J, and indeed because they are actually hidden behind the ring-like piercing edge 250. Thus, the noses 272 providing security against rotation can only be seen in FIG. 5K and in FIG. 5N.

In an alternative method which leads to the hollow body element in accordance with FIGS. 6A to 6E, a ring-like raised portion 260 is formed around the cylindrical recess 208 during the upsetting process in accordance with step a) by the use of correspondingly shaped upsetting punches 64, 66 and upsetting die buttons 92, 94 at the first broad side 2 of the section, which for example essentially represent a material volume which corresponds to the volume of the ring recess 212 around the hollow cylindrical projection. In this embodiment, the diameter of the cylindrical recess 208 is larger than the internal diameter of the hollow cylindrical projection 210. Furthermore the thread 206 terminates in a conical region 262 of a stepped hole 264 which, in this example, can be optionally used instead of a rounded thread run-out (which would also be possible in the embodiment of FIGS. 4A to 4C or FIGS. 5A to 5D respectively).

The base of the ring recess is, in this embodiment formed solely by a rounded transition 243 from the hollow cylindrical projection 210 into the conical surface 242, which would also be possible in the embodiment of FIGS. 4A to 4E and FIGS. 5A to 5D respectively.

During the upsetting process in accordance with step a), features 272 providing security against rotation are formed by corresponding profiling of the upsetting punches 9, 94 outwardly at the hollow cylindrical projection 210 and internally in the region of the ring recess 212 around the hollow cylindrical projection 210.

These features providing security against rotation can (as shown) be formed by ribs 272 and/or by grooves (not shown) at the radially outer side of the hollow cylindrical projection 210. These ribs 272 extend in the axial direction 226 and bridge the undercut 244 of the hollow cylindrical projection 210. They have a radial width which corresponds at least substantially to an amount in the range between 40% and 90% of the maximal radial depth of the undercut.

Thus, a hollow body element 200 arises for attachment to a component 280 which normally consists of sheet metal (FIGS. 7A and 7B respectively) with an at least substantially square or rectangular outline 202 with a first broad side 2 and a second broad side 3 and with a piercing section 246 which projects beyond the second broad side and has an undercut and is surrounded by a ring recess 212 in the second broad side as well as with an aperture 204 which extends from the first broad side 2 through the piercing section 246, with the aperture optionally having a thread cylinder 206 and with the hollow body element being characterized in that features 272 providing security against rotation are formed outwardly on the hollow cylindrical projection 210 and/or inwardly in the region of the ring recess 212 around the hollow cylindrical projection 210.

The hollow body element is further characterized in that the second broad side 3 lies radially outside of the ring recess 212 in one plane, i.e. apart from any rounded features or chamfers at the transitions into the side flanks of the hollow body element and thus no bars, grooves or undercuts are present in the region outside of the ring recess.

The ring recess 212 is executed with an outer diameter which is only slightly smaller than the smallest transverse dimension of the hollow body element rectangular in cross-section in plan view, whereby the ring recess forms webs in the range from 0.25 to 1 mm and preferably of about 0.5 mm with the second broad side 3 of the section which remain at the narrowest points 284, 286 in the plane of the second broad side.

The FIGS. 7A and 7B show how one and the same elements 200 in accordance with the invention can be used in accordance with FIGS. 5A to 5D with a thinner sheet metal part (FIG. 7A) of, for example, 0.7 mm thickness and with a thicker sheet metal part (FIG. 7B) of for example 1.85 mm thickness. The sheet metal material fills out the entire ring recess 212 after the pressing by means of a die button and lies in contact with the full surface of the ring recess and of the features 272 providing security against rotation in the region of the undercut. Thus, in both cases, a good overlap with the ribs 272 providing security against rotation takes place and thus a good security against rotation between the hollow body element 200 and the sheet metal part 280. The piercing section 246 is at least not essentially deformed in these examples and is introduced in self-piercing manner into the sheet metal part. The flattened end face 224 of the piercing section 246 lies with thin metal sheets (as shown in FIG. 7A) at the level of the lower side of the sheet metal part and with thicker sheet metal parts (FIG. 7B) above the lower side of the sheet metal part (i.e. the side of the sheet metal part remote from the body part of the hollow body element). In both cases, a ring recess 282 is present around the piercing section which has a form given by the specific shape of the complementary designed die button during the self-piercing attachment of the hollow body element in a press or through a robot or in a C-frame. In this connection, the die button has, as is usual in the self-piercing attachment of fastener elements, a central bore through which the punched-out slugs which arise are disposed of. Although the hollow body elements in accordance with the invention are made self-piercing, they can nevertheless be used in pre-pierced sheet metal parts. In a second embodiment of the hollow body element in accordance with the invention, a further range of thicknesses of sheet metal parts can be covered, for example 1.85 to 3 mm. It is simply necessary to make the piercing section somewhat longer.

As the hollow body elements which are square in plan view are attached in such a way that the second broad side 3 directly contacts the upper side of the sheet metal part 280, but does not or essentially does not dig into the sheet metal part, a notch action need not be feared so that a good fatigue behavior results thanks to a good fatigue resistance even under dynamic loads. Although the hollow body elements are square in plan view no special orientation of the die button relative to the respectively used setting head is necessary because the piercing section is circular in plan view and thus orientation-free. It is only necessary to ensure that the setting head and the die button lie coaxial to one another and to the longitudinal axis 226 of the hollow body element. During attachment of a further component to a component assembly in accordance with FIG. 7A or 7B, the further component is normally secured to the sheet metal part at the bottom by a screw (not shown) which is screwed, coming from the bottom into the thread. In this way, the connection between the hollow body element 200 and the sheet metal part is increased through tightening of the screw.

Furthermore it should be pointed out that ribs providing security against rotation would be conceivable which cross or bridge the ring recess 212 in the radial direction as for example shown in FIGS. 8A-8D, FIGS. 9A-9D or FIGS. 10A-10D. Such ribs providing security against rotation could lie flush with the broad side 3 (FIGS. 8A-8D) or could be present recessed with the ring recess (such features providing security against rotation are not shown in the drawings).

In the embodiment of FIGS. 8A-8D the free top sides of the ribs providing security against rotation, which are indicated with 272" lie in the same plane as the surface of the broad side 3 outside of the ring recess 272. The sides 272" can, however, also be arranged set back from the broad side 3. Since the ribs providing security against rotation bridge the ring recess 212, they are also to be found at the side of the ring-like piercing section 222 in the region of the under-cut 244.

Figure 9A:
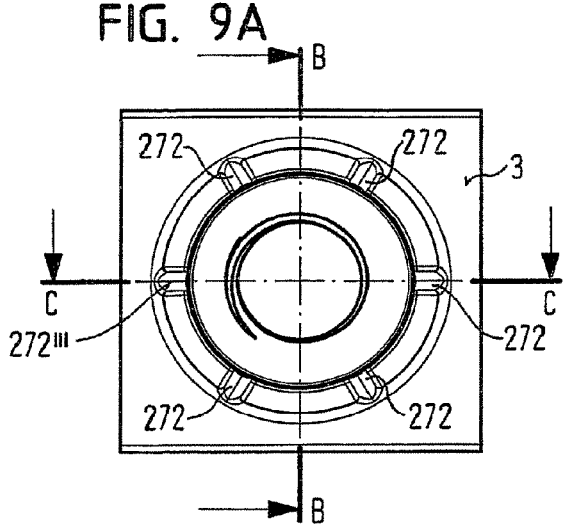
Figure 9B:
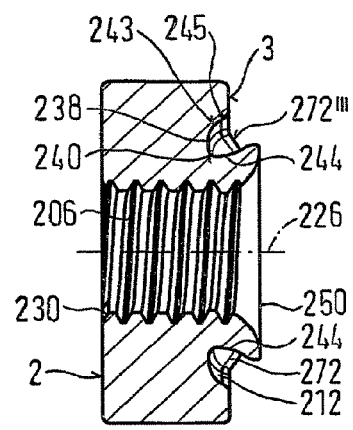
Figure 9C:
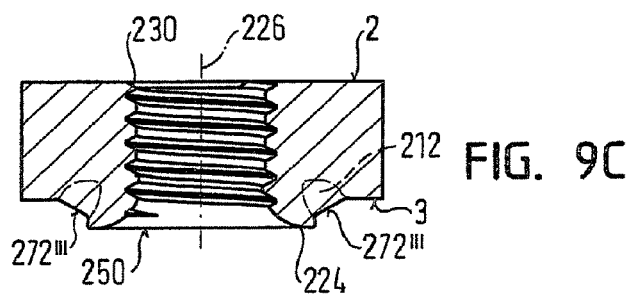
Figure 9D:
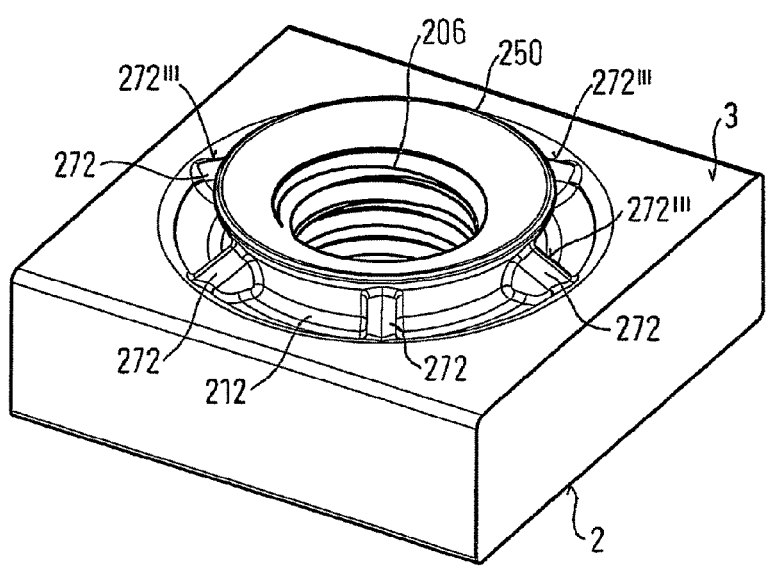
Figure 10A:
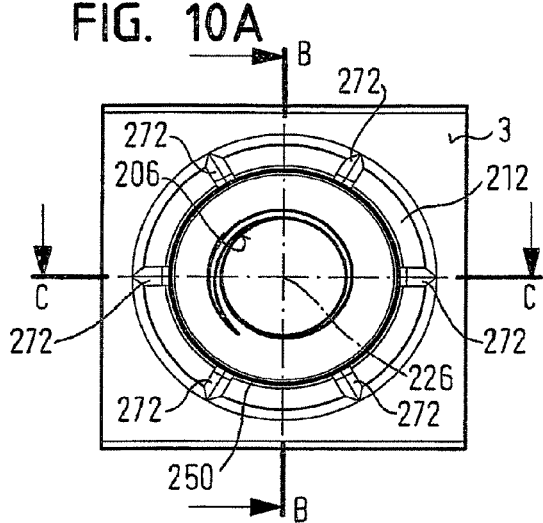
Figure 10B:
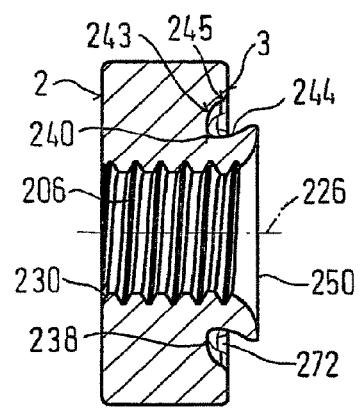
Figure 10C:
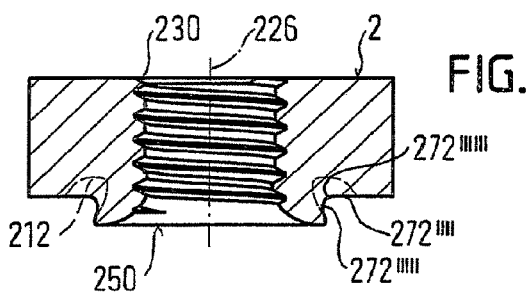
Figure 10D:
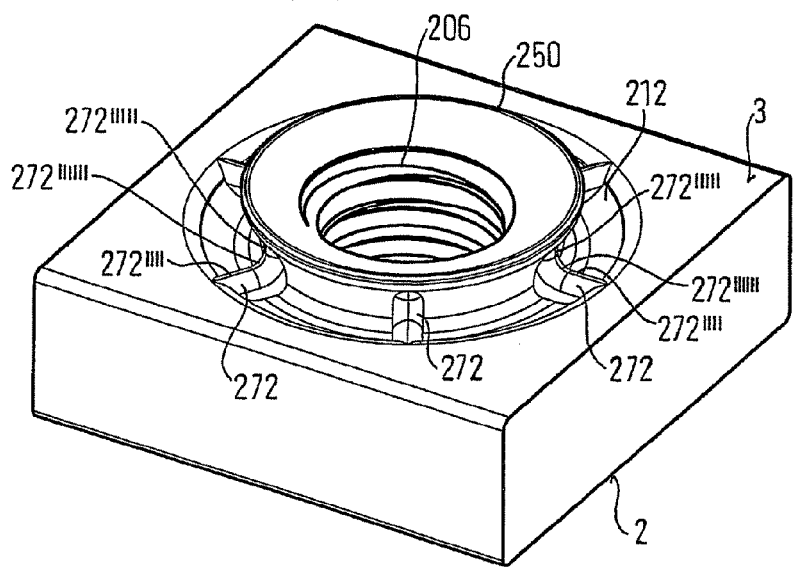
Figure 11A:
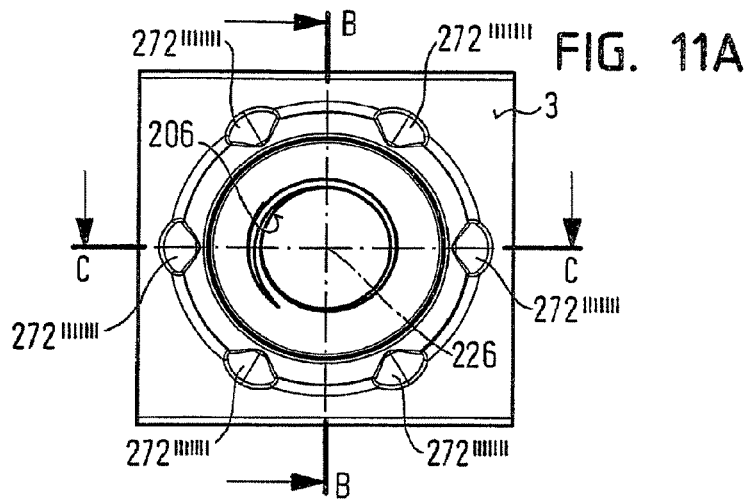
Figure 11B:
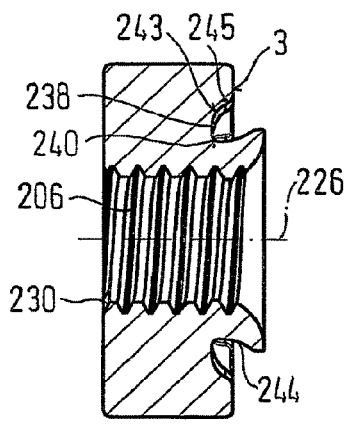
Figure 11C:
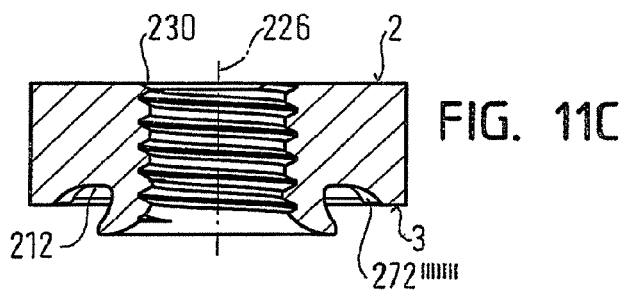
Figure 11D:
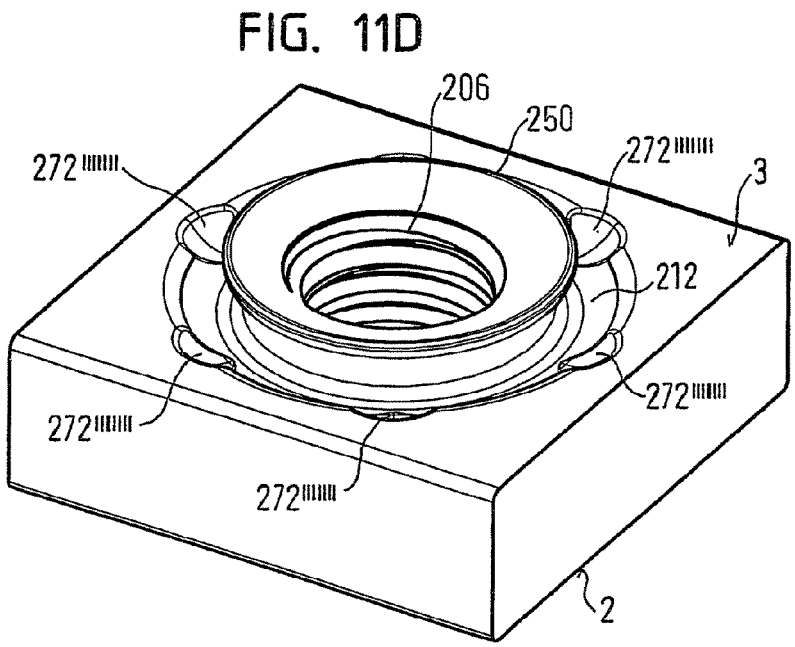
Figure 12A:
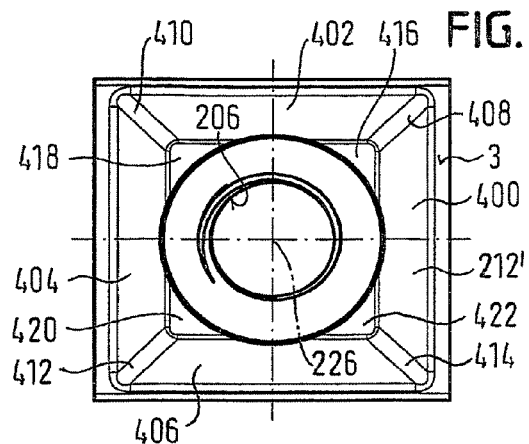
Figure 12B:
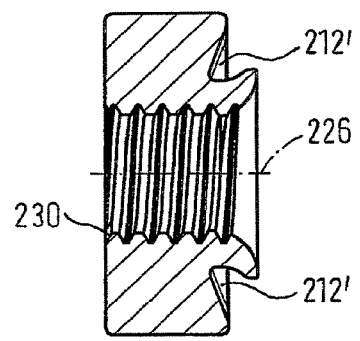
Figure 12C:
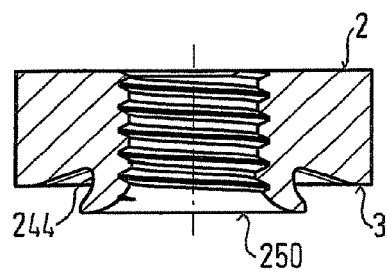
Figure 12D:
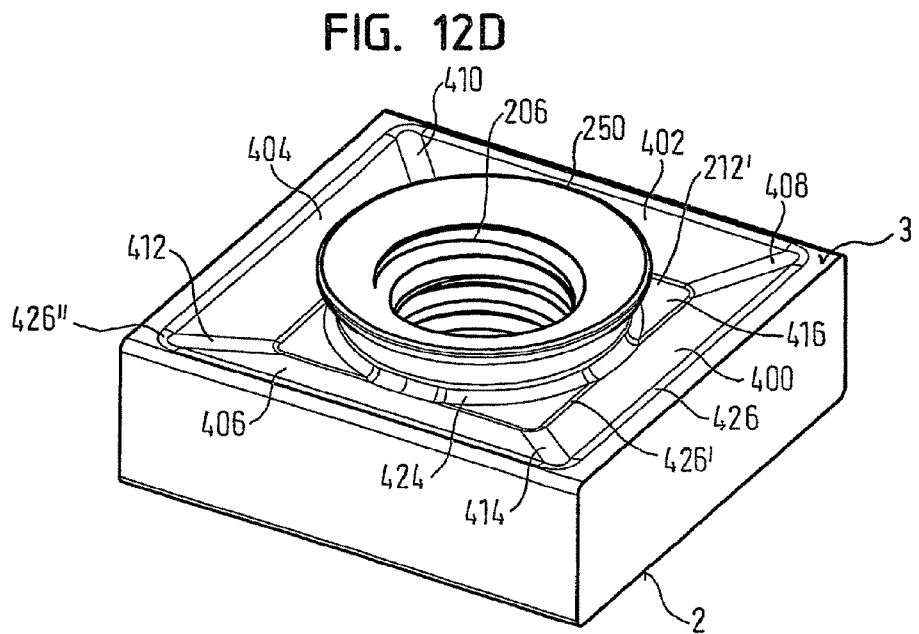

The FIGS. 9A-9C show a further variant in which the features providing security against rotation have the shape of ribs providing security against rotation which extend in the radial direction over the ring recess 212, but the upper sides 272''' of the ribs 272 providing security against rotation of the embodiment in accordance with FIGS. 9A-9D are set obliquely so that they rise going in the direction towards the piercing section 222 and thus not only extend in the radial direction over the ring recess and bridge it, but rather also extend in the axial direction at the under-cut 244 of the piercing section 222 over a considerable length or over the full length in the undercut 244.

The FIGS. 10A-10D shown an embodiment which is very similar to that of the FIGS. 9A-9D, but here the ribs providing security against rotation are angled so that they have a radial component 272'''' and an axial component 272''''' which merge into one another via a radius 272'''''' and thus generally have the described angled shape.

FIGS. 11A-11D show another kind of features providing security against rotation, here in the form of recess 272''''''' or grooves which are formed in the obliquely set side wall of the ring recess 212, with the recesses 272''''''' having an approximately shell-like shape in plan view here. Other shapes of the recesses are also conceivable, for example elongated grooves which are made narrower in the region of the broad side 3.

Finally, the FIGS. 12A-12D show a somewhat different form of a hollow body element in accordance with the invention.

The important distinction in the shape of the hollow body element in the embodiment in accordance with FIGS. 12A-12D is to be seen in the fact that the ring recess has a polygonal shape 212' here, and indeed in the specific case a square shape in plan view, with the ring recess having a corresponding number, i.e. four, of inclined surfaces 400, 402, 404 and 406 which merge into one another by means of radii 408, 410, 412 and 414. At the lowest point of the ring recess 212' which is polygonal in plan view there is an areal region which is defined by four corner regions 416, 418, 420 and 422 and is arranged in a plane perpendicular to the central longitudinal axis 226 of the element. The piercing section 222 merges via a radius 424 into these corner regions, with the radius having a diameter at the radially outermost point which is fractionally larger than the maximal transverse dimension of the areal region formed by the four corners 416, 418, 420 and 422 so that this radius ultimately merges into the lowest side of the four obliquely set surfaces. All thin parallel lines such as 426, 426' and 426" show radii or rounded surfaces which ensure amongst other things a gentle bending of the sheet metal part.

In this embodiment, it is not necessary to provide separate ribs providing security against rotation because the polygonal shape of the ring recess 212' itself takes care of the required security against rotation. This embodiment is also advantageous because the obliquely set surfaces and also the corner regions in the base region of the ring recess belong to the contact surface of the element so that it is possible to operate with correspondingly low surface pressures at the sheet metal part and the danger of settling of the element does not exist. Nevertheless, high values for the security against rotation can be achieved as well as a high pull-out resistance.

The rounded regions between the obliquely set surfaces also have the advantage that no pronounced sharp features are present at these points in the sheet metal part which could lead to fatigue in particular with dynamic loading of the component. Because the piercing section 222 produces a circular hole in the sheet metal part, as in other embodiments, stress concentrations are also not to be expected here which could lead to fatigue cracks in operation. During the attachment of the hollow body element to the sheet metal part ,the element is at least substantially not deformed, a deformation is undesired and the sheet metal part is brought by a suitable complementary shape of the die button into the square recess 212' in the region around the piercing section 222 and fully into contact with this piercing section around the piercing section.

In all embodiments of FIGS. 8A-8D to FIGS. 12A-12D, the hollow body element is made flat at the first broad side 2, i.e. with an end face which lies perpendicular to the central longitudinal axis 226 of the element in accordance with the previous embodiment of FIGS. 5A-5N. It is, however, entirely conceivable that the corresponding end face in the embodiments of FIGS. 8A-8D to FIGS. 12A-12D could be made similar to the embodiment of FIG. 6D. In the FIGS. 12A-12D this signifies that, instead of a circular ring shape raised portion as in FIG. 6D, the raised portion will then have a corresponding polygonal shape, here a square shape.

When the talk in this application is of a polygonal shape this also includes in any case polygons with three to twelve polygonal surfaces i.e. obliquely set surfaces.

In the embodiment of FIGS. 12A-12D, a considerable material displacement takes place in the region of the recess which is square in plan view as shown so that it is here entirely possible for the hollow cylindrical projection which is transformed by the flattening into the piercing section 222 to be achieved solely by material displacement from the second broad side 3 of the hollow body element, i.e. it is not necessary to carry out an upsetting process in the first step of the manufacturing method in which material is displaced from a first broad side 2. i.e. the first manufacturing step a) in accordance with claim 1 can be replaced here by a forming process in which the hollow cylindrical projection 210 is formed solely by material displacement out of the region of the ring recess which is polygonal in plan view and in the region of the hollow space of the hollow cylindrical projection 210. During the subsequent piercing process the body formed in this way is then pierced starting from the first broad side 2 and up to the base 216 of the hollow space 232.

Although the present invention is intended for the manufacture of elements which are rectangular or square in outline, it could also be used for the manufacture of elements which are polygonal, oval or circularly round in outline or of elements with another shape, provided the tools that are used are designed in order to manufacture the desired shape of the outline from the strip of the section, for example through the use of correspondingly designed punching tools.

The design of the ring recess 212 does not necessarily have to take place at the same time as the upsetting process, but could rather be combined with the piercing process or with the flattening process, i.e. the piercing punches 84, 86 or the flattening punches 88, 90 must in this case have a corresponding shape.

It is not necessary to separate the hollow body elements from one another in the progressive tool, but rather the section can be retained or used after manufacture of the general shape of the hollow body elements in sections or in re-coiled shape, with a separation into individual hollow body elements then only taking place when the section is used in a setting head for the attachment of the hollow body elements to a component.

In all embodiments, all materials can be named as an example for the material of the section and of the functional elements which are manufactured from it which, in the context of cold deformation, reach the strength values of class 8 or higher in accordance with the ISO standard, for example a 35B2alloy in accordance with DIN 1654. The fastener elements formed in this way are suitable amongst other things for all normal steel materials for drawing quality sheet metal parts and also for aluminum or its alloys. Also aluminum alloys, in particular those of high strength, can be used for the section or the functional elements, for example AlMg5. Sections or functional elements of higher strength magnesium alloys such as for example AM50 also enter into consideration.

The invention claimed is:

1. Method for the manufacture of hollow body elements for attachment to components consisting of sheet metal, said hollow body elements having a substantially square or rectangular outline, by cutting individual elements to length from a section present in form of one of a profile bar and a coil after prior punching of apertures into the section, using a progressive tool having a plurality of working stations in each of which respective operations are carried out, the method comprising:

a) in a first step, starting from a section rectangular in cross-section, an upsetting process is carried out which leads to a cylindrical recess having a diameter and a recess base at a first broad side of the section and to a hollow cylindrical projection having an inner space with an inner diameter and a space base at a second broad side of the section opposite to the first broad side with a web of material being present between said recess base and said space base and the projection being surrounded by a ring recess, wherein, during this step, the diameter of the cylindrical recess and the inner diameter of the hollow cylindrical projection are made substantially the same, b) in a second step, said web of material is punched out to form a through-going aperture having a diameter which substantially corresponds to said diameter of said recess and to said inner diameter, c) in a third step, which is combinable with the second step b), the hollow cylindrical projection is flattened at its free end for the formation of a piercing section and an undercut at an outer side of said hollow cylindrical projection, the hollow body element being subsequently separated from the section.

2. Method in accordance with claim 1, wherein during one of the upsetting process of step a), the piercing process of step b) and the flattening process of step c), the opening of the cylindrical recess is executed at the first broad side of the section with a rounded or chamfered run-in edge.

3. Method in accordance with claim 1, wherein during one of the upsetting process of step a), the piercing process of step b) and the flattening process of step c), the opening of the hollow cylindrical projection is provided at its free end with a rounded or chamfered run-out edge.

4. Method in accordance with claim 1, wherein during the upsetting process of the first step a), the free end of the hollow cylindrical projection is provided at an outside with a chamfer.

5. Method in accordance with claim 1, wherein during the upsetting process of the first step a), the ring recess is provided with a base region in the form of a ring which lies at least approximately in a plane parallel to the first and second broad sides, is provided at a radially inner side with a substantially rounded transition into an outer side of the hollow cylindrical projection, and merges at the radially outer side into a conical surface.

6. Method in accordance with claim 5, wherein the conical surface of the ring recess has an included cone angle in a range between 60 and 120°, preferably of approximately 90°.

7. Method in accordance with claim 5, wherein the transition from the ring-shaped region of the ring recess into the conical surface is rounded.

8. Method in accordance with claim 5, wherein a run-out of the conical surface of the ring recess into the second broad side of the section is rounded.

9. Method in accordance with claim 1 wherein, during the manufacture of the undercut, this is formed by a cylindrical part of the hollow cylindrical projection, which merges approximately level to the second broad side of the section into a region of the hollow cylindrical projection, which is thickened upon carrying out the step c), and which substantially projects beyond the second broad side of the section.

10. Method in accordance with claim 9, wherein the thickened region of the hollow cylindrical projection is made substantially conical and diverges away from the first and second broad side.

11. Method in accordance with claim 10, wherein the cone angle of the thickened region of the hollow cylindrical projection lies in a range from 30° and 70°.

12. Method in accordance with claim 1, wherein after the flattening process, the hollow cylindrical projection ends at its free end outwardly in a piercing edge, which is provided as a sharp edge.

13. Method in accordance with claim 1 wherein the ring recess is executed with an outer diameter, which is only made somewhat smaller than a smallest transverse dimension of the hollow body element, which is rectangular in plan view, whereby the ring recess with the second broad side of the section forms webs that remain at narrowest points in a plane of the second broad side with a width in a range from 0.25 to 1 mm.

14. Method in accordance with claim 1, wherein during the upsetting process in accordance with step a) features providing security against rotation are formed one of outwardly at the hollow cylindrical projection and inwardly in a region of the ring recess around the hollow cylindrical projection.

15. Method in accordance with claim 14, wherein features providing security against rotation are formed by one of ribs and grooves at a radially outer side of the hollow cylindrical projection.

16. Method in accordance with claim 14, wherein features providing security against rotation are formed by ribs, which extend in an axial direction and bridge the undercut of the hollow cylindrical projection.

17. Method in accordance with claim 16, wherein the ribs providing security against rotation have a radial width, which corresponds substantially to between 40% and 90% of a maximum radial depth of the undercut.

18. Method in accordance with claim 14, wherein features providing security against rotation are formed in the step a) by radially extending ribs, which bridge the ring recess.

19. Method in accordance with claim 14, wherein features providing security against rotation are made in the form of obliquely positioned ribs, which extend in a radial direction over the ring recess and in an axial direction along the hollow cylindrical projection.

20. Method in accordance with claim 14, wherein features providing security against rotation are made in the form of ribs, which extend in a radial direction across the ring recess and in an axial direction along the hollow cylindrical projection.

21. Method in accordance with claim 14, wherein features providing security against rotation are made in the form of recesses in one of step a), step b) and step c), wherein the recesses are arranged in the inclined surface of the ring recess.

22. Progressive tool for the manufacture of hollow body elements having a substantially polygonal outline and adapted for attachment to components comprising sheet metal hollow body elements by cutting individual elements to length from a section having a rectangular cross section and first and second broad sides, said section being present in the form of one of a profile bar and a coil after prior piercing of apertures into the section, optionally with subsequent formation of a thread cylinder, said progressive tool having a plurality of working stations, wherein in each case two operations are simultaneously carried out for each stroke of the progressive tool in each working station for the section, wherein an upsetting process is carried out in a first working station using upsetting tools each adapted to form a cylindrical recess having a diameter and a recess base at a first broad side of the section and a hollow cylindrical projection having an inner diameter and a space base at a second broad side of the section opposite to the first broad side, with said recess base and said space base being separated by a web of material and with the projection being surrounded by a ring recess, wherein said upsetting tools are adapted so that the diameter of each cylindrical recess and the inner diameter of each hollow cylindrical projection are made substantially the same, wherein piercing tools each comprising a cylindrical piercing punch having a diameter corresponding substantially to said diameter of said cylindrical recess and said inner diameter are provided in a second working station for piercing said web of material, wherein flattening and dilating tools are provided in one said working station and adapted to carry out a flattening and dilating process for the manufacture of an undercut surrounding each cylindrical projection and a piercing edge at said cylindrical projection, and wherein cut of punches are provided in a final working station for the separation of in each case two hollow body elements from the section by means of the cut-off punch.

23. A method for the manufacture of hollow body elements for attachment to components consisting of sheet metal, in particular for the manufacture of hollow body elements, having a substantially square or rectangular outline by cutting individual elements to length from a section present in form of one of a profile bar and a coil after prior piercing of apertures into the section, using a progressive tool having a plurality of working stations in each of which respective operations are carried out, said section having a first broad side and a second broad side, the method comprising:

a) in a first step, starting from a section rectangular in cross-section, a forming process is carried out in which a hollow cylindrical projection having a hollow internal space with a base is formed at said second broad side as well as a recess surrounding said hollow cylindrical projection but without forming a cylindrical recess at the first broad side of the section and, said recess surrounding said hollow cylindrical projection being polygonal in plan view and having faces set obliquely to a central longitudinal axis of the hollow body element, said forming step being effected by forming said hollow cylindrical projection partly from the material displaced during the formation of the recess and partly from the material displaced during the formation of said hollow internal space, b) in a second step, a web remaining between said first broad side and the base of the base of the hollow internal space is punched out to form a through-going aperture, and c) in a third step, which is combinable with the second step b), the hollow cylindrical projection is flattened at its free end for the formation of a piercing section and an undercut at the outer side, whereafter the hollow body element is separated from the section.

* * * * *